(12) United States Patent
Capps, Jr. et al.

(10) Patent No.: US 7,996,693 B2
(45) Date of Patent: *Aug. 9, 2011

(54) INTEGRATED CIRCUIT ENVIRONMENT INITIALIZATION ACCORDING TO INFORMATION STORED WITHIN THE INTEGRATED CIRCUIT

(75) Inventors: Louis Bennie Capps, Jr., Gerogetown, TX (US); Mark Elliott Hack, Austin, TX (US); Steven Paul Hartman, Round Rock, TX (US); Michael Jay Shapiro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 12/277,365

(22) Filed: Nov. 25, 2008

(65) Prior Publication Data

US 2009/0094446 A1 Apr. 9, 2009

Related U.S. Application Data

(63) Continuation of application No. 11/304,956, filed on Dec. 15, 2005, now Pat. No. 7,472,297.

(51) Int. Cl.
*G06F 1/26* (2006.01)

(52) U.S. Cl. ........ 713/320; 713/300; 713/310; 713/321; 713/322; 713/323; 713/324; 713/330; 713/340

(58) Field of Classification Search .................. 713/300, 713/310, 320–324, 330, 340
See application file for complete search history.

(56) References Cited

U.S. PATENT DOCUMENTS

| | | | |
|---|---|---|---|
| 5,764,529 A | 6/1998 | Capps, Jr. et al. | |
| 6,381,693 B2 | 4/2002 | Fish et al. | |
| 6,401,201 B2 | 6/2002 | Fish et al. | |
| 6,694,492 B1 * | 2/2004 | Shakkarwar | 716/133 |
| 6,745,269 B2 | 6/2004 | Bui et al. | |
| 6,772,356 B1 | 8/2004 | Qureshi et al. | |
| 6,791,157 B1 | 9/2004 | Casto et al. | |
| 6,826,705 B2 | 11/2004 | Tani | |
| 6,967,522 B2 | 11/2005 | Chandrakasan et al. | |
| 7,149,905 B2 | 12/2006 | Brown et al. | |
| 7,188,261 B1 | 3/2007 | Tobias et al. | |
| 7,224,215 B2 | 5/2007 | Osborn | |
| 7,276,925 B2 * | 10/2007 | Dobberpuhl et al. | 324/750.3 |
| 7,290,155 B2 | 10/2007 | George et al. | |
| 7,472,297 B2 * | 12/2008 | Capps et al. | 713/320 |
| 2004/0025061 A1 * | 2/2004 | Lawrence | 713/300 |
| 2004/0034785 A1 | 2/2004 | Tai et al. | |
| 2004/0250245 A1 | 12/2004 | Rao et al. | |
| 2005/0216245 A1 | 9/2005 | Hobson | |

* cited by examiner

*Primary Examiner* — Abdelmoniem Elamin
(74) *Attorney, Agent, or Firm* — Mitch Harris, Atty at Law, LLC; Andrew M. Harris; Matthew B. Talpis

(57) ABSTRACT

A method for automatically initializing the operational settings of a system from information stored within a non-volatile storage of an integrated circuit so that the operational requirements of the integrated circuit, which may be a microprocessor, are met by the system when the system is operating. During manufacturing test, environmental requirements of the integrated circuit are determined and stored within the non-volatile storage of the integrated circuit. During system initialization, environmental control values such as required operating voltage and frequency and cooling requirements are determined from the test values, which are read from the integrated circuit. The values are read by an interface of the system from an interface of the integrated circuit. System settings are controlled by the values to provide the required operating environment and the values may be captured within the system for subsequent operations and initialization sequences.

6 Claims, 3 Drawing Sheets

INTEGRATED CIRCUIT ENVIRONMENT INITIALIZATION ACCORDING TO INFORMATION STORED WITHIN THE INTEGRATED CIRCUIT

The Present Application is a Continuation of U.S. patent application 11/304,956, filed on Dec. 15, 2005, now U.S. Pat. No. 7,472,297, and claims the benefit of priority therefrom under 35 U.S.C.§120.

BACKGROUND

1. Technical Field of the Present Invention

The present invention generally relates to integrated circuits, and more specifically, to integrated circuits that automatically initialize their operational settings according to the specific requirements of the system in which the integrated circuit is used.

2. Description of Related Art

Designers of integrated circuits are designing common system boards that support multiple versions of an integrated circuit where each version has a differing frequency, voltage, and/or heat dissipation requirement. This design allows a single common system board to be used in multiple product lines that are distinguished from one another based upon performance type criteria (e.g. cell phones).

Manufacturers of the integrated circuits for these systems often maintain multiple part numbers for the various integrated circuits that performed similar functionality but were manufactured using differing technologies. The manufacturing in differing technologies often allows increased functionality and operation of the integrated circuit at lower voltages and higher frequencies.

It would be a distinct advantage for the both the manufacturer and designer if there were an integrated circuit that would automatically initialize its operational settings according to the requirements of the system in which the integrated circuit is being used. The designer would avoid the complex and burdensome issues previously described in supporting these multiple versions and the manufacturer could eliminate the need for multiple part numbers and the like.

SUMMARY OF THE PRESENT INVENTION

The present invention includes an integrated circuit, a system including the integrated circuit, and methods of operation of the integrated circuit and system. The integrated circuit has an identifier that is used to access memory that stores sets of operating conditions of the integrated circuit for specific environmental conditions. The identifier is used to access one of the stored sets of operating conditions that corresponds to one or more environmental conditions of a system in which the integrated circuit is being used. The system also includes a control circuit that alters the operation of specific elements of the system to support the set of read operating conditions. The environmental condition sets may be stored in the integrated circuit and accessed by an access circuit internal to the integrated circuit, or the environmental conditions may be stored in the system and accessed according to an identifier retrieved from the integrated circuit.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT OF THE PRESENT INVENTION

The present invention is a method and apparatus for an integrated circuit to automatically initialize its operational settings according to the requirements of the system in which the integrated circuit is being used. This is accomplished by using a unique identification value stored in the integrated circuit in combination with a look-up table containing various final test values for the integrated circuit for characteristics such as voltage, frequency and thermal requirements. These final test values are then read and used by the system to set characteristics of the integrated circuit such as the frequency, voltage and thermal cooling requirements according to the design of the particular system (e.g. 1.5 v, 1.2 MHz, 3 Watts).

Figure 1:
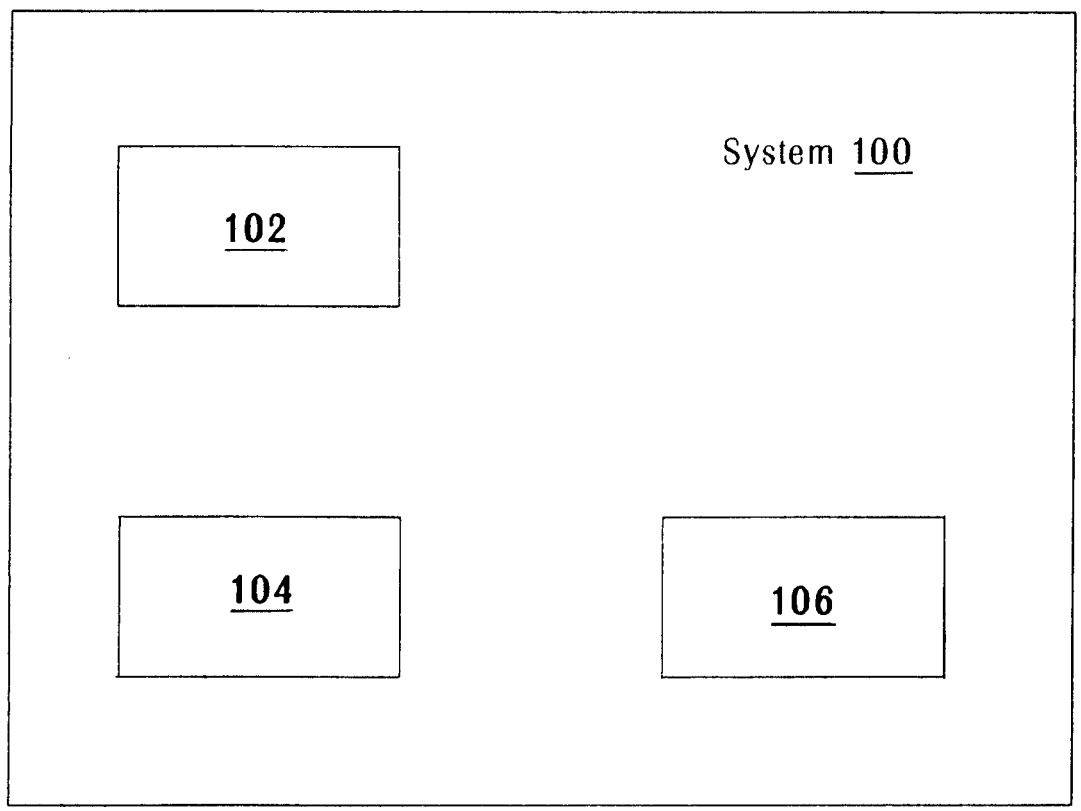
FIG. 1 is a block diagram illustrating a System 100 in which the present invention can be practiced.

Reference now being made to FIG. 1, a block diagram is shown illustrating a System 100 in which the present invention can be practiced. The System 100 can be any electronic device including but not limited to a cell phone, computer, game machine, monitor, LCD TV, automobile, PDA, home appliance and the like. System 100 includes one or more integrated circuits 102-106 each of which provide functionality in accordance with the design of the System 100. Integrated circuit 104 implements the method and apparatus of the present invention and is explained in greater detail in connection with FIG. 2 below.

Figure 2:
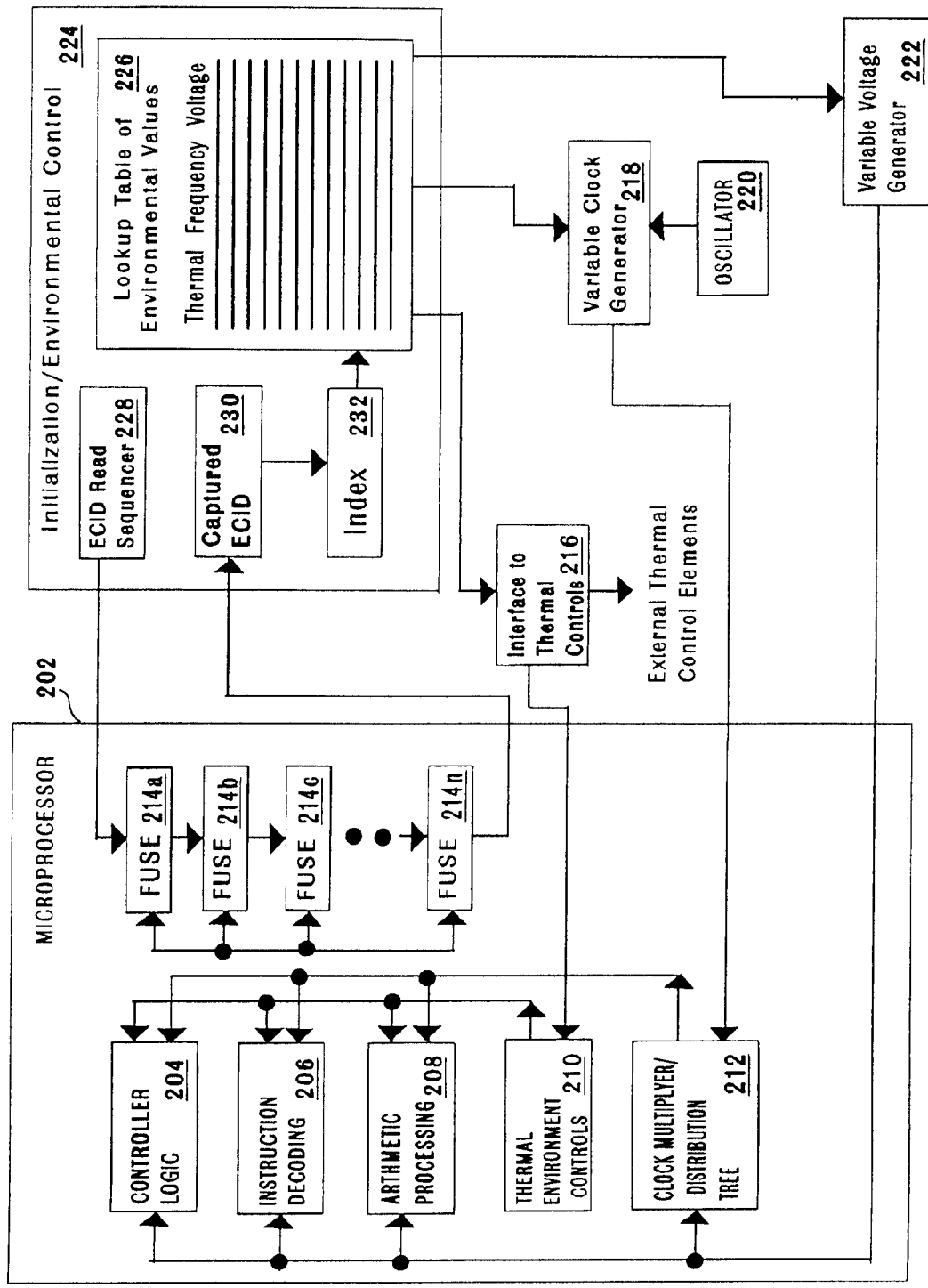
FIG. 2 is a schematic diagram illustrating in greater detail the integrated circuit of FIG. 1 according to the teachings of the present invention.

Reference now being made to FIG. 2, a schematic diagram is shown illustrating in greater detail the integrated circuit 104 of FIG. 1 according to the teachings of the present invention. For purposes of illustration, integrated circuit 104 is shown with a Microprocessor 202. It should be understood, however, that the applicability of the present invention is not limited to any particular implementation of an integrated circuit and is equally applicable to all types of integrated circuits that can be adapted, as described herein, to the desires of the system in which they are used.

Integrated circuit 104 includes a CPU or Microprocessor 202, Environmental Control Unit 224, Variable Voltage Generator 222, Oscillator 220, Variable Clock Generator 218, and Interface to Thermal Controls 216.

Microprocessor 202 can be, for example, a custom processor having specialized components or a common processor such as the PowerPC™ by IBM. In this embodiment, the Microprocessor 202 is illustrated as containing common elements such as Controller Logic 204, Instruction Decoding 206, Arithmetic Processing 208, Thermal Environment Controls 210, and Clock Multiplier/Distribution Tree 212. The purpose and operation of these common elements are well understood, and therefore, further explanation is unnecessary.

Microprocessor 202 also includes a bank of fuses 214a-n that can be implemented using various schemes such as anti-fuses, metal and the like. Although the Microprocessor 202 uses fuses in this embodiment, it should be understood that any type of structure that is capable of retaining its logical value in some manner could be used (e.g. non-volatile memory, or low power schemes to a dedicated memory unit after power has been discontinued to the Microprocessor 202).

The Interface to Thermal Controls Unit 216 provides a convenient interface from the Thermal Environment Controls 210 and Environmental Control Unit 224 to thermal controls that are external to the integrated circuit 104 such as a fan or other heat dissipation device(s). The Thermal Controls Unit 216 can control the heat dissipation devices itself or provide information such as thermal requirements to external controls.

The Variable Clock Generator 218 is used in combination with the Oscillator 220 to generate a clock frequency based upon information provided from the Environmental Control Unit 224. The clock frequency is provided to the Clock Multiplier/Distribution Tree 212.

The Environmental Control unit 224 includes an Electronic Chip Identification (ECID) Read Sequencer 228, a Look-up Table 226, optional Captured Electronic Chip Identification (ECID) Unit 230, and Index 232. The Environmental Control Unit 224 can reside in the Microprocessor 202 itself, the integrated circuit 104 (as shown), or on the board that the integrated circuit 104 is mounted (not shown).

The Electronic Chip Identification (ECID) Read Sequencer 228 is used to read the value represented by the bank of fuses 214a-n (Electronic Chip Identification (ECID)). The Captured ECID unit 230 retrieves the ECID and implemented in non-volatile memory or the like to store the (ECID) so that the Microprocessor 202 is not required to be powered on to retrieve the ECID during subsequent power cycle sequences. The Index 232 is used to access the Look-up Table 226 using the ECID as an index as explained below.

As each integrated circuit is manufactured, it is typically characterized at module final test for operating frequency and current drain. Some of these integrated circuits will require a higher voltage to reach the desired frequency; others will operate at the desired frequency but will dissipate too much power at certain voltage levels. As each integrated circuit is tested, these characteristics are recorded in the Look-up Table 226. Look-up Table 226 can be implemented in any type of non-volatile memory.

The organization of these characteristics can take many forms. The preferred embodiment of the present invention uses a Look-up Table 226 that organizes the characteristics (e.g. Thermal, Frequency, and Voltage) such that the ECID represents one or more of the Frequency, Voltage, or Thermal requirements of the System 100. The ECID value is then used to access the appropriate column in the Look-up Table 226 to retrieve the missing information corresponding to the ECID representation (e.g. ECID represents Frequency and Voltage, then this value is used to determine the thermal requirements of the Microprocessor 202).

An example of how the Look-up Table 226 could be represented is illustrated in the Table below.

| Thermal Requirement | Frequency | Voltage Level | Other |
|---|---|---|---|
| 85 C. | 4 GHz | 1 V | Thermal calibration data |
| 90 C. | 4.4 GHz | 1.1 V | Thermal calibration data |

In an alternative embodiment of the present invention, the Microprocessor does not require the use of fuses 214a-n, and the Environmental Control Unit 224 does not require the use of the ECID Reader Sequencer Unit 228 or Captured ECID Unit 230. In this alternative embodiment, the Index Unit 232 is used by System 100 to specify access to the table using a particular value for a characteristic such as frequency and retrieves the remaining associated characteristic values (e.g. voltage level and thermal requirement).

The functions and interactions between the various components of the integrated circuit 104 are explained below in connection with FIG. 3.

Figure 3:
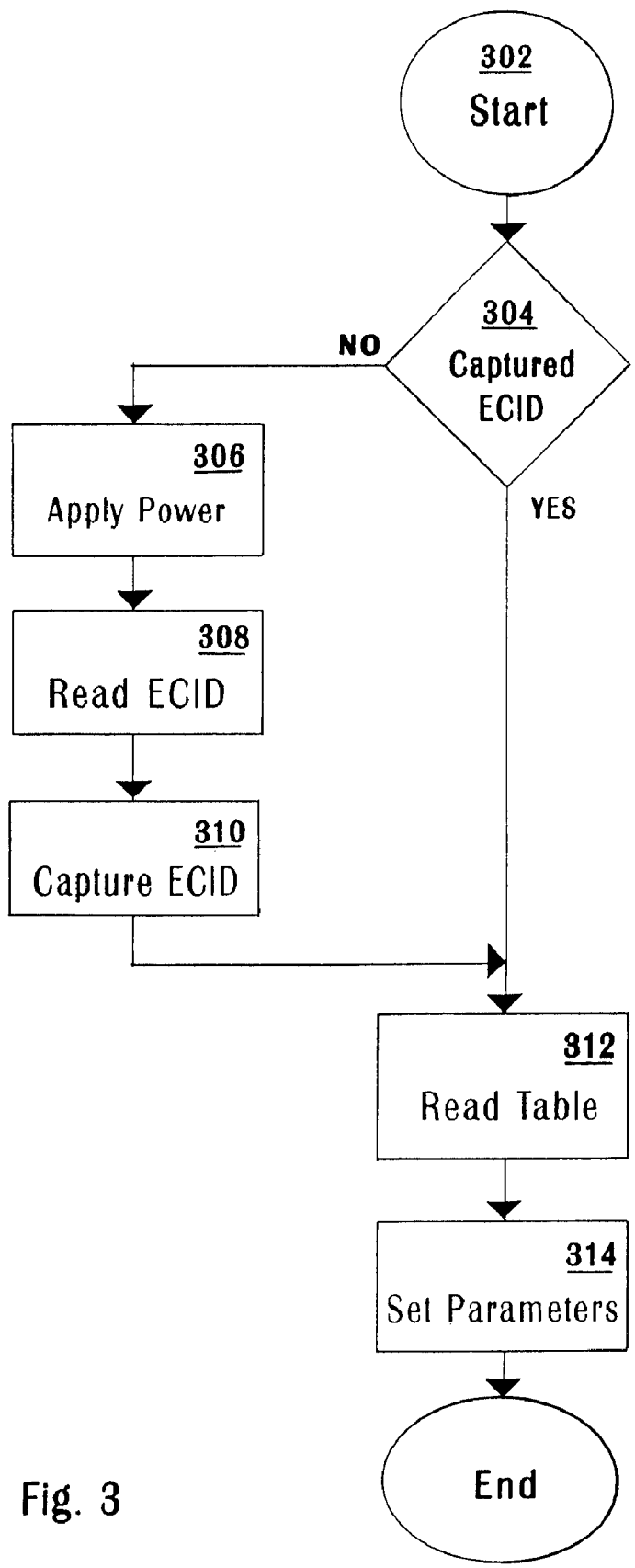
FIG. 3 is a flow chart illustrating the method used for initializing the Microprocessor of FIG. 2 according to the teachings of a preferred embodiment of the present invention.

Reference now being made to FIG. 3, a flow chart is shown illustrating the method used for initializing the Microprocessor 202 of FIG. 2 according to the teachings of a preferred embodiment of the present invention. The flow chart begins upon the powering of system 100 (FIG. 1) (step 300). The System 100 determines whether the Captured ECID Unit 230 has the ECID of the Microprocessor 202 (Step 304).

If the ECID has been captured the method proceeds to read the Look-up Table 226 as described below. If, however, the ECID value has not been captured, then the System 100 applies enough power to the integrated circuit 104 in order to be able to read the value of the ECID from the fuses 214a-n using the ECID Read Sequencer 228 (Steps 306 and 308). In addition, as an optional implementation, the Captured ECID Unit 230 captures the ECID for later use (Step 310).

The value of the ECID is then used by Environmental Control unit 224 to access the Look-up Table 226 in combination with the desired frequency, voltage, or other characteristic and retrieves the values for the remaining environmental characteristics such as frequency or voltage and thermal/cooling requirements (Step 312). These values are used by the Environmental Control Unit 224 to set the Variable Clock Generator 218 to generate a desired frequency using the Oscillator circuitry 220 and provide a clock signal to the Clock Multiplier Distribution Tree 212.

The Environmental Control Unit 224 uses the thermal value to control the Interface to Thermal Controls unit 216 to set the appropriate heat dissipation requirements of the Microprocessor 202 such as fan speed or the like.

The Environmental Control Unit 224 uses the voltage value to set the core voltage of the Microprocessor 202 to a value that supports the selected frequency (Step 312).

As previously explained, in an alternative embodiment of the present invention, the Environmental Control Unit 224 does not require the use of the ECID and can be accessed by the System 104 to specify a characteristic stored in the Look-up Table 226. In this alternative embodiment, steps 306 to 310 would not be required and the method would implement steps 312 to 316 after access by the System 100 in this alternative embodiment.

It is thus believed that the operation and construction of the present invention will be apparent from the foregoing description. While the method and system shown and described has been characterized as being preferred, it will be readily apparent that various changes and/or modifications could be made without departing from the spirit and scope of the present invention as defined in the following claims.

What is claimed is:

1. A system, comprising, comprising:
   an integrated circuit including a non-volatile storage for storing an indication of a set of environmental conditions for operation of the integrated circuit that were predetermined during manufacturing test of the integrated circuit;

a control unit that, during initialization of the system, first retrieves the indication of the set of environmental conditions from the non-volatile storage within the integrated circuit, second retrieves the set of environmental conditions from either the non-volatile storage within the integrated circuit or another storage within the system in accordance with the indication of the set of environmental conditions, sets operating parameters within the system and external to the integrated circuit, that impose environmental conditions that conform to operating conditions for the integrated circuit that meet requirements specified by the set of environmental conditions, wherein the control unit further determines whether or not the indication of the set of environmental conditions has been previously retrieved, and if the indication of the set of environmental conditions has been previously retrieved, performing the setting in conformity with an indication of the operating parameters stored within the system and external to the integrated circuit, and if the indication of the particular set of environmental conditions has not been previously retrieved, provides operating voltage to the integrated circuit sufficient to access the non-volatile storage within the integrated circuit, and performs the first retrieving of the indication of the set of environmental conditions from the non-volatile storage within the integrated circuit, performs the second retrieving of the set of environmental conditions from either the non-volatile storage within the integrated circuit or the another storage within the system in accordance with the indication of the set of environmental conditions retrieved from the integrated circuit, and performs the setting in conformity with the retrieved set of environmental conditions.

2. The system of claim 1, wherein the environmental conditions specified by the set of environmental conditions include an operating voltage, an operating frequency and a maximum operating temperature requirement.

3. The system of claim 1, wherein the operational settings include a power supply voltage supplied by the system to the integrated circuit, a clock frequency supplied by the system to the integrated circuit and a fan speed of a fan within the system that cools the integrated circuit.

4. The system of claim 1, wherein the indication of the set of environmental conditions provides an index to a table of sets of environmental conditions, and wherein the control unit uses the index to retrieve the set of environmental conditions from the non-volatile storage within the integrated circuit or the another storage.

5. The system of claim 4, wherein the set of environmental conditions is stored within the non-volatile storage of the integrated circuit, and wherein the control unit retrieves the set of environmental conditions through an interface of the integrated circuit.

6. The system of claim 4, wherein the set of environmental conditions is stored within the another storage within the system and wherein the control unit uses the indication as an index or address to retrieve the set of environmental conditions from the another storage of within the system.

* * * * *